United States Patent
Hobbet (10) Patent No.: US 8,331,053 B2
(45) Date of Patent: Dec. 11, 2012

(54) SYSTEMS AND METHODS FOR ADJACENT TRACK INTERFERENCE (ATI) RISK MANAGEMENT

(75) Inventor: Jeffrey R. Hobbet, Holly Springs, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 206 days.

(21) Appl. No.: 12/567,292

(22) Filed: Sep. 25, 2009

(65) Prior Publication Data

US 2011/0075290 A1  Mar. 31, 2011

(51) Int. Cl.
G11B 15/04  (2006.01)

(52) U.S. Cl. ............ 360/60; 360/31; 360/62; 360/77.02

(58) Field of Classification Search .......................... None
See application file for complete search history.

(56) References Cited

U.S. PATENT DOCUMENTS

| | | | | |
|---|---|---|---|---|
| 6,101,053 A * | 8/2000 | Takahashi | | 360/46 |
| 6,947,234 B2 * | 9/2005 | Lamberts et al. | | 360/53 |
| 7,170,700 B1 * | 1/2007 | Lin et al. | | 360/31 |
| 7,227,708 B2 * | 6/2007 | Feng | | 360/31 |
| 7,567,397 B2 * | 7/2009 | Lu | | 360/31 |
| 7,567,400 B2 * | 7/2009 | Cheng | | 360/60 |
| 7,768,729 B2 * | 8/2010 | Moser et al. | | 360/31 |
| 7,774,539 B2 * | 8/2010 | Mettler et al. | | 711/112 |
| 8,102,613 B2 * | 1/2012 | Duan et al. | | 360/31 |
| 2004/0193798 A1 * | 9/2004 | Kuwamura | | 711/114 |
| 2005/0180267 A1 * | 8/2005 | Jeong et al. | | 368/96 |
| 2006/0066971 A1 * | 3/2006 | Alex et al. | | 360/31 |
| 2006/0132954 A1 * | 6/2006 | Wada et al. | | 360/48 |
| 2007/0074083 A1 * | 3/2007 | Olds et al. | | 714/54 |
| 2007/0220306 A1 * | 9/2007 | Childs et al. | | 714/5 |
| 2008/0001562 A1 * | 1/2008 | Hobbet et al. | | 318/270 |
| 2008/0130154 A1 * | 6/2008 | Mettler et al. | | 360/53 |
| 2008/0174905 A1 * | 7/2008 | Ueda | | 360/77.04 |
| 2008/0189469 A1 * | 8/2008 | Mettler et al. | | 711/100 |
| 2008/0198492 A1 * | 8/2008 | Ahn | | 360/31 |
| 2009/0244775 A1 * | 10/2009 | Ehrlich | | 360/135 |
| 2011/0026159 A1 * | 2/2011 | Tsai et al. | | 360/75 |

* cited by examiner

Primary Examiner — Dismery Mercedes (74) Attorney, Agent, or Firm — Ference & Associates LLC (57) ABSTRACT

Embodiments of the invention broadly contemplate systems, methods and arrangements for managing Adjacent Track Interference (ATI) risk through intelligent management of a table that logs individual tracks creating a risk of ATI in tracks adjacent thereto. Embodiments of the invention provide that tracks considered being at low risk for creating ATI be ejected from the table in order to maintain a track-level log of manageable size.

18 Claims, 6 Drawing Sheets

| Cylinder/Head | Number of Writes | Update Order (Most Recent = 1) |
|---|---|---|
| Candidate A | 1 | 1 |
| Candidate B | 15 | 5 |
| Candidate C | 27 | 6 |
| Candidate D | 500 | 8 |
| Candidate E | 10 | 2 |
| Candidate F | 200 | 3 |
| Candidate G | 17 | 7 |
| Candidate H | 5 | 4 |

Cylinder / Head column represents a location in the table that you are currently tracking for potential ATI impact Number of Writes column is the number of writes to given cylinder / head location being tracked in the table Update order is the order in which the entries were last updated in the table (1 is the most recently updated entry and 8 is the least recently updated entry)

Candidate A has the lowest write count (only 1) but it is also the newest record in the table (this should be retained if the table is full)

Candidate D is the oldest record in the table and it is also the record that has the highest write count (this should be retained if the table is full)

FIG. 3

| Cylinder/Head | Number of Writes | Update Order (Most Recent = 1) | Weighted Order |
|---|---|---|---|
| Candidate D | 500 | 8 | 1 |
| Candidate G | 17 | 7 | 2 |
| Candidate C | 27 | 6 | 3 |
| Candidate B | 15 | 5 | 4 |
| Candidate H | 5 | 4 | 5 |
| Candidate F | 200 | 3 | 6 |
| Candidate E | 10 | 2 | 7 |
| Candidate A | 1 | 1 | 8 |

Weighted Order is calculated by the position number of the candidate in the re-ordered table with the least recently updated entry in position 1 and the most recently updated entry in position 8

FIG. 4

| Cylinder/Head | Number of Writes | Update Order (Most Recent = 1) | Weighted Write (2x w - order position) |
|---|---|---|---|
| Candidate A | 1 | 1 | 2 |
| Candidate H | 5 | 4 | 4 |
| Candidate E | 10 | 2 | 6 |
| Candidate B | 15 | 5 | 8 |
| Candidate G | 17 | 7 | 10 |
| Candidate C | 27 | 6 | 12 |
| Candidate F | 200 | 3 | 14 |
| Candidate D | 500 | 8 | 16 |

Weighted Write is calculated by 2x the position number of the candidate when the table is re-ordered by # of writes starting with the lowest number of writes in position 1 and the highest number of writes in position 8

FIG. 5

| Cylinder/Head | Number of Writes | Update Order (Most Recent = 1) | Weighted Write (2x ordered position) | Weighted Order | Total Weight |
|---|---|---|---|---|---|
| Candidate A | 1 | 1 | 2 | 8 | 10 |
| Candidate B | 15 | 5 | 8 | 4 | 12 |
| Candidate C | 27 | 6 | 12 | 3 | 15 |
| Candidate D | 500 | 8 | 16 | 1 | 17 |
| Candidate E | 10 | 2 | 6 | 7 | 13 |
| Candidate F | 200 | 3 | 14 | 6 | 20 |
| Candidate G | 17 | 7 | 10 | 2 | 12 |
| Candidate H | 5 | 4 | 4 | 5 | 9 |

From this method, Candidate H should be removed from the table as it has, on balance, the lowest score taking into consideration both when it was last updated and the current write count

FIG. 6

SYSTEMS AND METHODS FOR ADJACENT TRACK INTERFERENCE (ATI) RISK MANAGEMENT

In the realm of storage devices (for example computer hard drives), adjacent track interference (ATI) is encountered when a particular track on the storage device is written a large number of times (e.g., 30,000 times or more) without the adjacent track(s) being written to. The data on adjacent tracks can become corrupted by ATI. This overwrite causes some magnetic flux interference on the adjacent tracks that, over many cycles, can accumulate and leave the adjacent tracks unreadable.

BRIEF SUMMARY

Embodiments of the invention broadly contemplate systems, methods and arrangements for managing ATI risk through intelligent management of a table that logs individual tracks creating a risk of ATI in tracks adjacent thereto. Various embodiments of the invention provide a table that is fixed at a manageable size yet exceedingly accurate in predicting ATI risk due to intelligent weighting and editing processes. Embodiments of the invention provide that tracks considered being at low risk for creating ATI be ejected from the table in order to maintain a track-level log of manageable size.

In summary, one aspect of the invention provides a method comprising: utilizing one or more processors to execute program instructions configured to: add one or more tracks to a track-level Adjacent Track Interference (ATI) log in response to a write action; determine an Adjacent Track Interference (ATI) risk for the one or more tracks; and maintain the track-level ATI log via ejecting one or more tracks from the track-level ATI log in response to a determination that the one or more tracks has low ATI risk.

Another aspect of the invention provides a system comprising: one or more system processors; a main memory; and a hard drive comprising one or more modules comprising one or more processors configured to execute program instructions, the program instructions comprising computer readable program code configured to: add one or more tracks to a track-level Adjacent Track Interference (ATI) log in response to a write action; determine an Adjacent Track Interference (ATI) risk for the one or more tracks; and maintain the track-level ATI log via ejecting one or more tracks from the track-level ATI log in response to a determination that the one or more tracks has low ATI risk; wherein the one or more system processors direct information stored in the main memory to the hard drive.

A further aspect of the invention provides an apparatus comprising: one or more modules comprising one or more processors configured to execute program instructions, the program instructions comprising computer readable program code configured to: add one or more tracks to a track-level Adjacent Track Interference (ATI) log in response to a write action; determine an Adjacent Track Interference (ATI) risk for the one or more tracks; and maintain the track-level ATI log via ejecting one or more tracks from the track-level ATI log in response to a determination that the one or more tracks has low ATI risk.

A still further aspect of the invention provides a computer program product comprising a computer readable storage medium having computer readable program code embodied therewith, the computer readable program code being configured to: add one or more tracks to a track-level Adjacent Track Interference (ATI) log in response to a write action; determine an Adjacent Track Interference (ATI) risk for the one or more tracks; and maintain the track-level ATI log via ejecting one or more tracks from the track-level ATI log in response to a determination that the one or more tracks has low ATI risk.

For a better understanding of embodiments of the present invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described presently preferred embodiments. Thus, the following more detailed description of the embodiments of the invention, as represented in the figures, is not intended to limit the scope of the claims but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The illustrated embodiments of the invention will be best understood by reference to the figures/drawings. The following description is intended only by way of example, and simply illustrates certain selected presently preferred embodiments of the invention.

ATI can occur in adjacent tracks because of excessive writing to a track (on a storage device such as a disk drive/hard drive). For example, referring to FIG. 2, consider a track T as having adjacent tracks T+2 through T−2. If track T is written a large number of times before tracks T+1 or T−1 are also written, then the data on T+1 or T−1 could become corrupted via ATI.

Complications arise in deciding when and how to rewrite the data on the adjacent tracks to counter ATI. Current solutions to ATI in use lack the ability to effectively manage ATI at the track level.

The inventor has recognized that simply keeping a log of all writes to all tracks in order to predict ATI is problematic given the increasing amount of tracks in modern computing systems. For example, logging all tracks with a table for systems with storage devices at or above about 160 G size has proven untenable because the size of a table/log capable of keeping such logging information would be unacceptably large. Nor is "banding" the tracks together (that is, treating multiple tracks as one for tracking and ATI prevention purposes) suitable, as this leads to wasted resources spent preventing ATI in tracks that are not at risk for ATI, for example rewriting tracks not at risk for ATI but included in the band. Accordingly, the inventor has recognized that maintaining a table of all tracks is inappropriate because, in and among other reasons, the log table would be too large and that banding the tracks together leads to needless ATI prevention on tracks not at risk for ATI.

Accordingly, at least one presently preferred embodiment of the invention provides an intelligently managed table that logs all writing to tracks but is edited to retain only those (entries relating to) tracks that are relevant from an ATI risk perspective. Embodiments of the invention provide a table that retains records of tracks only as necessary to prevent ATI events, ejecting tracks determined to be at low risk for causing ATI, thus making the table size acceptable even in view of the ever increasing size of storage devices (for example hard drives) and the number of tracks they contain.

The description now turns to the figures and certain select and non-limiting presently preferred embodiments of the invention will be described in further detail.

Figure 1:
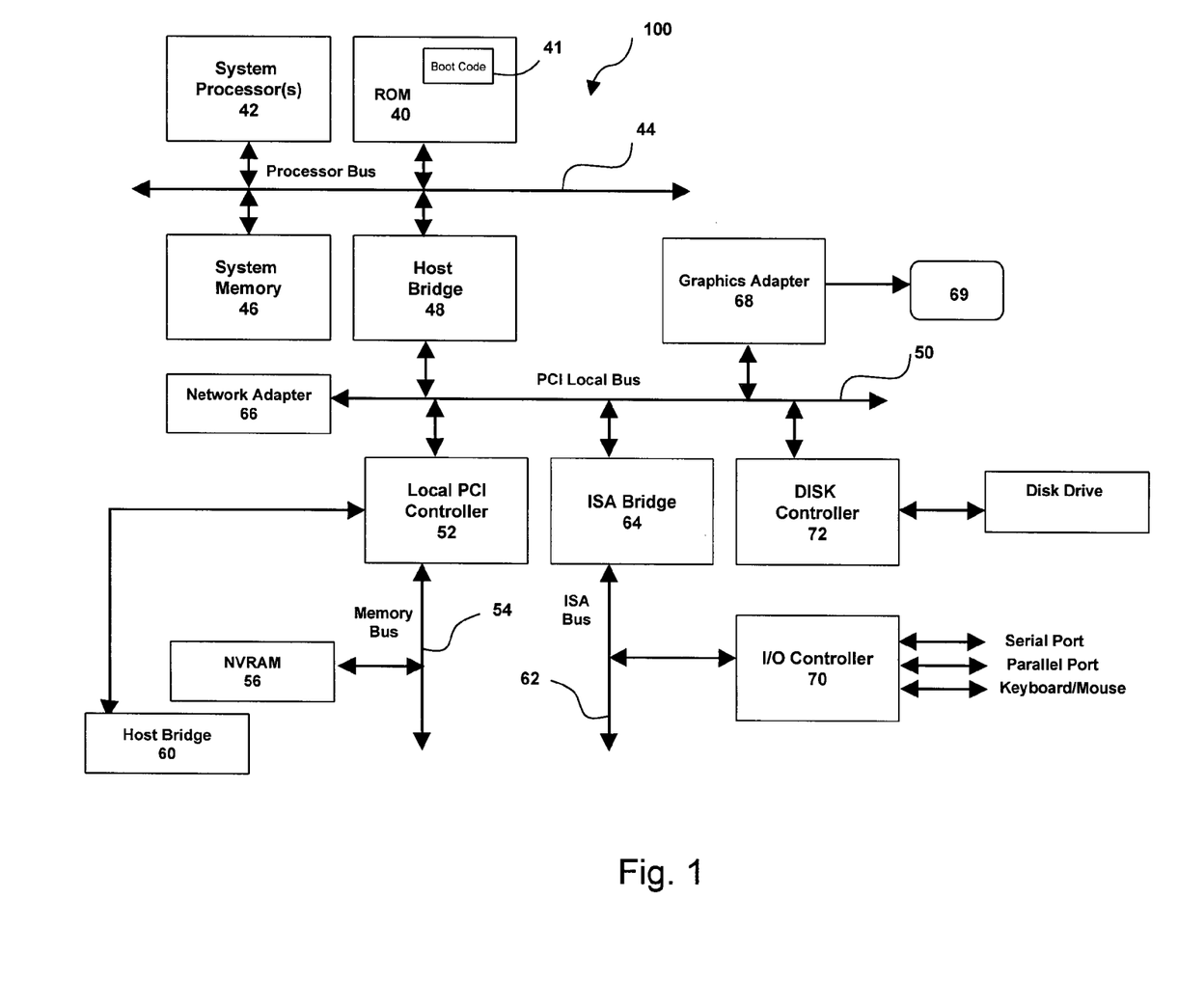
FIG. 1 illustrates an exemplary computer system.

Referring now to FIG. 1, there is depicted a block diagram of an illustrative embodiment of a computer system 100. The illustrative embodiment depicted in FIG. 1 may be an electronic device such as a desktop, laptop, workstation, mobile computer and the like. As is apparent from the description, however, the embodiments of the invention may be implemented in any appropriately configured electronic device having a storage device at risk for ATI, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces electronic device 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, and the like. A disk controller 72 connects a disk drive with PCI local bus 50. The USB Bus and USB Controller (not shown) are part of the Local PCI controller (52).

Figure 2:
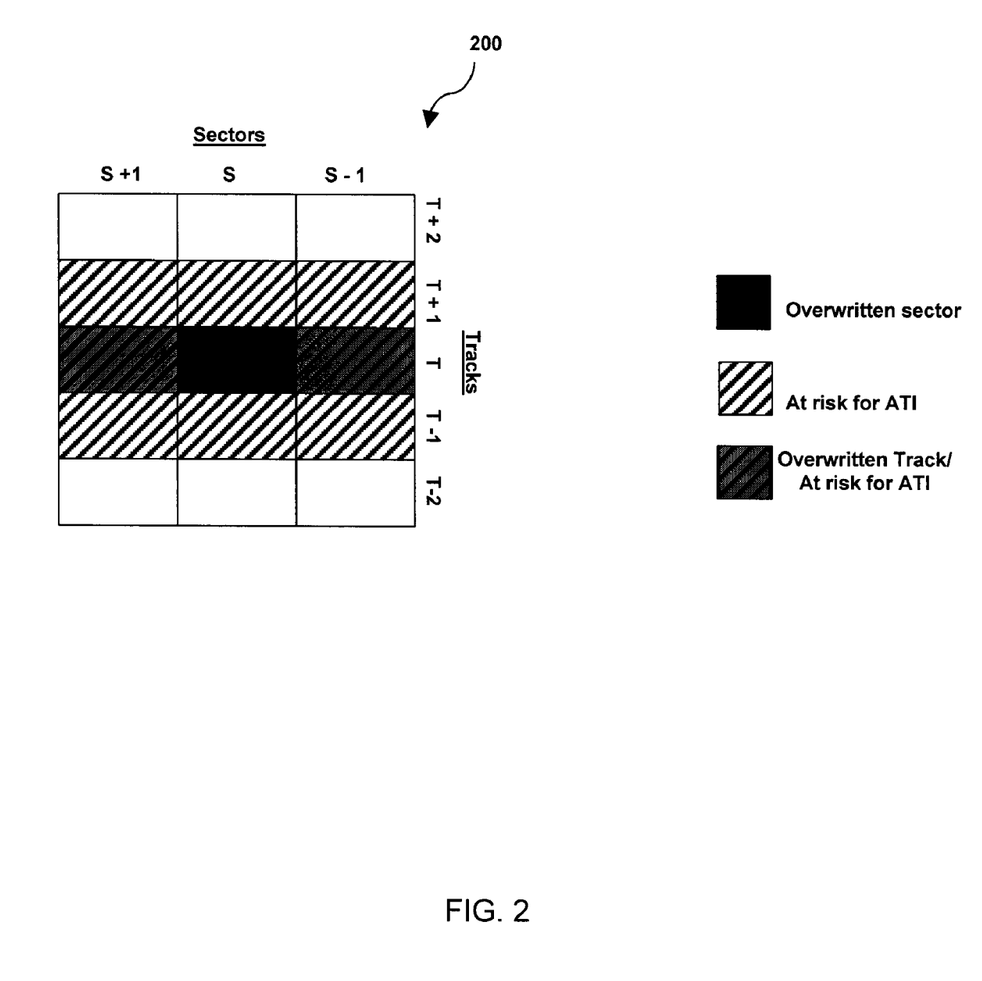
FIG. 2 illustrates an exemplary storage device having tracks at risk for ATI.

As discussed herein, FIG. 2 schematically illustrates as a non-limiting example five parallel tracks (T+2 through T−2) on a disk drive labeled and the sectors of those tracts are delimited as S+1 through S−1. As shown, one sector S of track T has been overwritten to the point that surrounding adjacent tracks (T+1, T+2), may be at risk for ATI (for example exhibit increased bit error rates). ATI has a limited effect on distant tracks, for example tracks T+2, T−2. As discussed herein, one process for avoiding ATI is to log all tracks that have been overwritten and take appropriate action (for example data scrubbing adjacent tracks). However, as discussed herein, the amount of data necessarily logged (for example in a log or management table) for such a process would be preclusively large, especially considering the increasing amount of tracks in modern computing systems.

Figure 3:
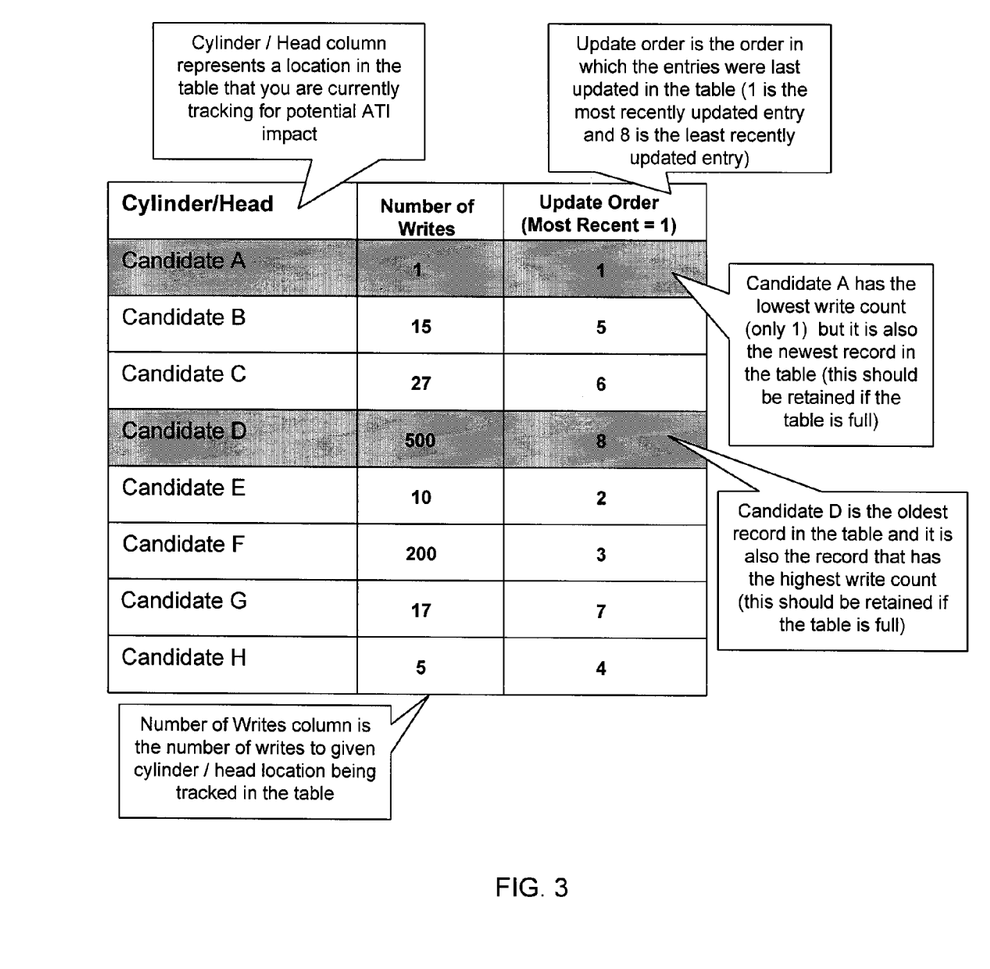
FIG. 3 illustrates an exemplary ATI risk management table according to one embodiment of the invention.

Accordingly, as illustrated in a non-limiting example in FIG. 3, embodiments of the invention provide an intelligent management log/table that can be kept to an acceptable, predetermined size or size range suitable for keeping an effective log of all tracks sufficiently relevant to prevention of ATI. Embodiments of the invention provide a method for selecting which entry or entries in the table to remove when the table is or is near full without negatively impacting ATI prevention, thus allowing a table of predetermined size to be maintained that accurately predicts ATI risk. Once ATI risk is known, appropriate measures (for example data scrubbing/rewriting data) can be taken.

Embodiments of the invention balance parameters affecting ATI in order to select appropriate candidates for retention and ejection from the table. Embodiments of the invention, for example, take into account the write count to a candidate track and the order in which the a candidate track is added to the table in order to ascertain which entries in the table can be discarded/ejected and which entries in the table should be maintained. Embodiments of the invention guard against ejecting recently written entries that have not accumulated sufficient writes and guard against ejecting entries with many writes but that have not been recently written to.

FIG. 3-FIG. 6 illustrate one non-limiting and exemplary suitable mechanism for managing an ATI risk log/table according to embodiments of the invention; however, it should be noted that this is merely presented as a non-limiting example of one presently preferred embodiment of the invention. Those having ordinary skill in the relevant art will readily understand that other mechanisms will be equally suitable depending upon the particular implementation and that these alternatives fall within the scope and spirit of the exemplary embodiments of the invention as described herein.

Referring to FIG. 3, a location (for example cylinder/head column) represents the location on the storage device of a candidate track being tracked and logged in the table in order to ascertain potential ATI risk to adjacent tracks. A list of candidate locations (for example Candidates A-H) populate the table, each being added/updated upon a write. A number of writes is logged for each candidate location. An update order is also maintained for each of the candidate locations corresponding to the time since the candidate location has been updated (written to). As shown, both the number of writes and the update order are tracked, with an update order of "1" being the most recent (last write).

Taking candidate location A as an example, it has most recently been written to (update order=1) and so is added to the table. The candidate location A is also the least written, number of writes=1. In contrast, candidate location D has the most number of writes (500), but is also the oldest (least recently written to, update order=8). According to embodiments of the invention, an intelligent table management process ensures retention of candidate locations having either the highest update order (here, candidate A) or the highest number of writes (here, candidate D).

Embodiments of the invention select candidate locations that will be discarded from the table based on a weighting scheme. In order to select the candidates creating the most risk for ATI in adjacent tracks, compared to other table entries, embodiments of the invention employ a total weight, which takes into account the number of writes and a weighted order field. The total weight (track total weight) is calculated therefrom. Embodiments of the invention utilize the total weight field to select candidates to discard/eject from the table, keeping the table to an acceptable size.

Figure 4:
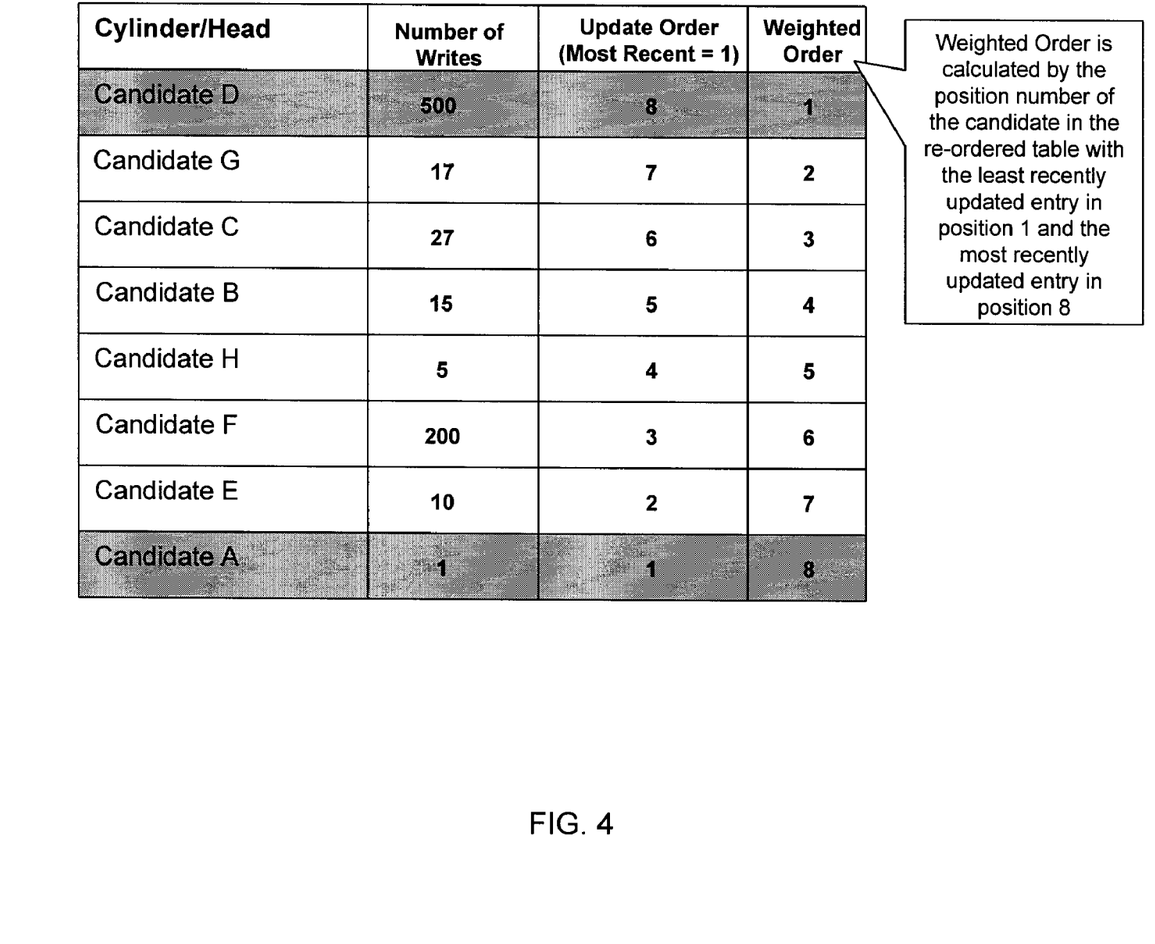
FIG. 4 illustrates an exemplary ATI risk management table according to one embodiment of the invention.

Referring to FIG. 4, the table has been reordered according to a weighted order. The weighted order is the inverse of the update order and is calculated by the position number of the candidates in the reordered table, with the least recently updated (oldest) entry in position 1 and the most recently updated (newest) entry in the last position (here, position 8). Thus, candidate D, having an update order of 8 appears first in the table (weighted order=1), whereas candidate A, having an update order of 1, appears in position 8 (weighted order=8), as it is the most recently updated indicator (1).

Referring to FIG. 5, the table has again been reordered based on the number of writes. Here, the table has an additional field, the weighted write field, which is a multiple (here 2×) of the candidate position in the table when the table is reordered by the number of writes, starting with the lowest number of writes in the first position (1) and the highest number of writes in the last position (8). The weighted write order is a multiple of ordered entries in this configuration in order to ensure that the number of writes associated with a candidate is weighted somewhat heavier than the update order (order written to).

Figure 5:
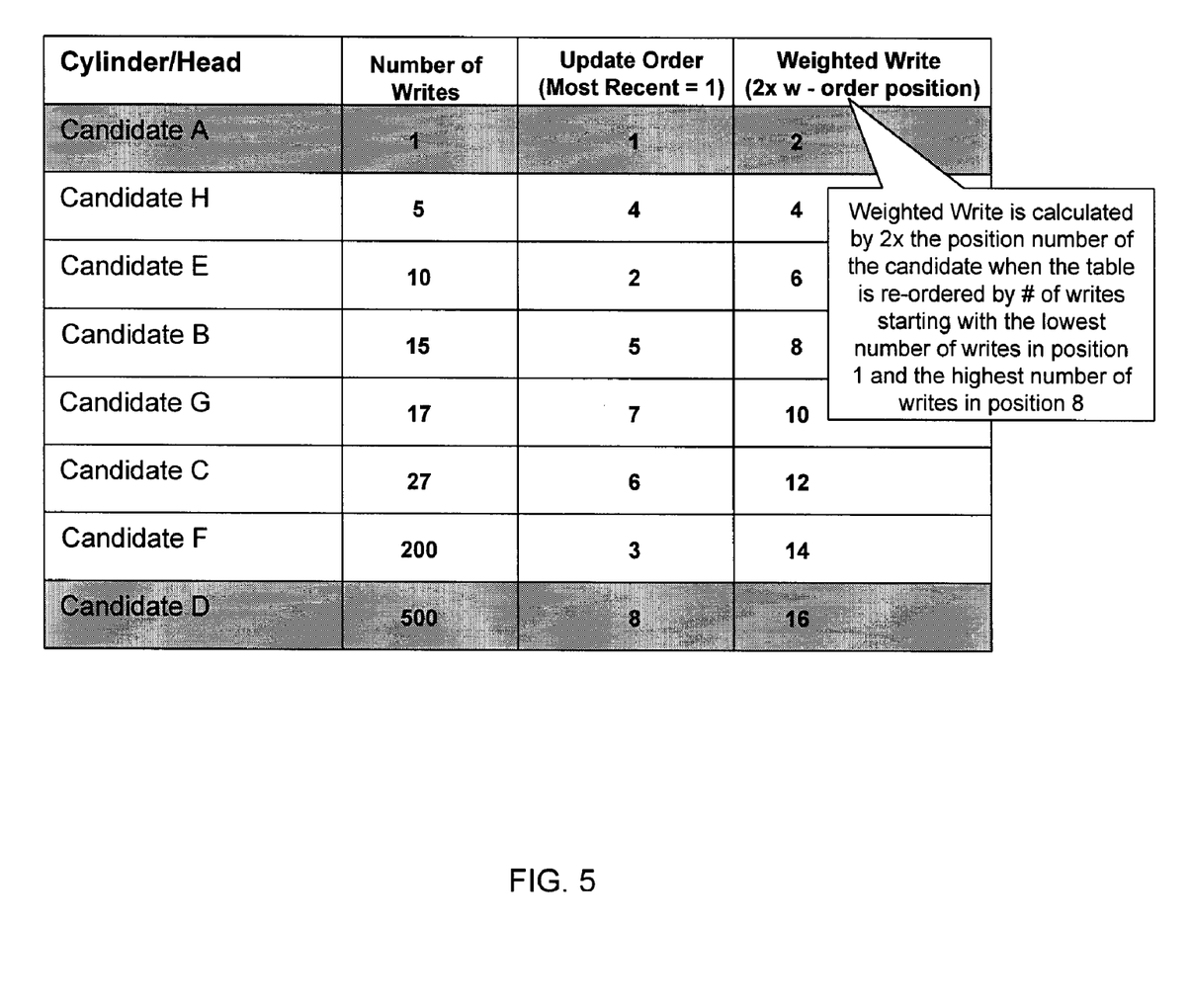
FIG. 5 illustrates an exemplary ATI risk management table according to one embodiment of the invention.

For example, candidate A has the lowest number of writes, and thus is placed in position 1, which yields a weighted write order of 2, whereas candidate D has the most writes (500), placing it in position 8, yielding a weighted write order of 16. Thus, candidates are reordered in the table according to their weighted write order, with candidate A appearing in position 1 and candidate D appearing in position 8.

Figure 6:
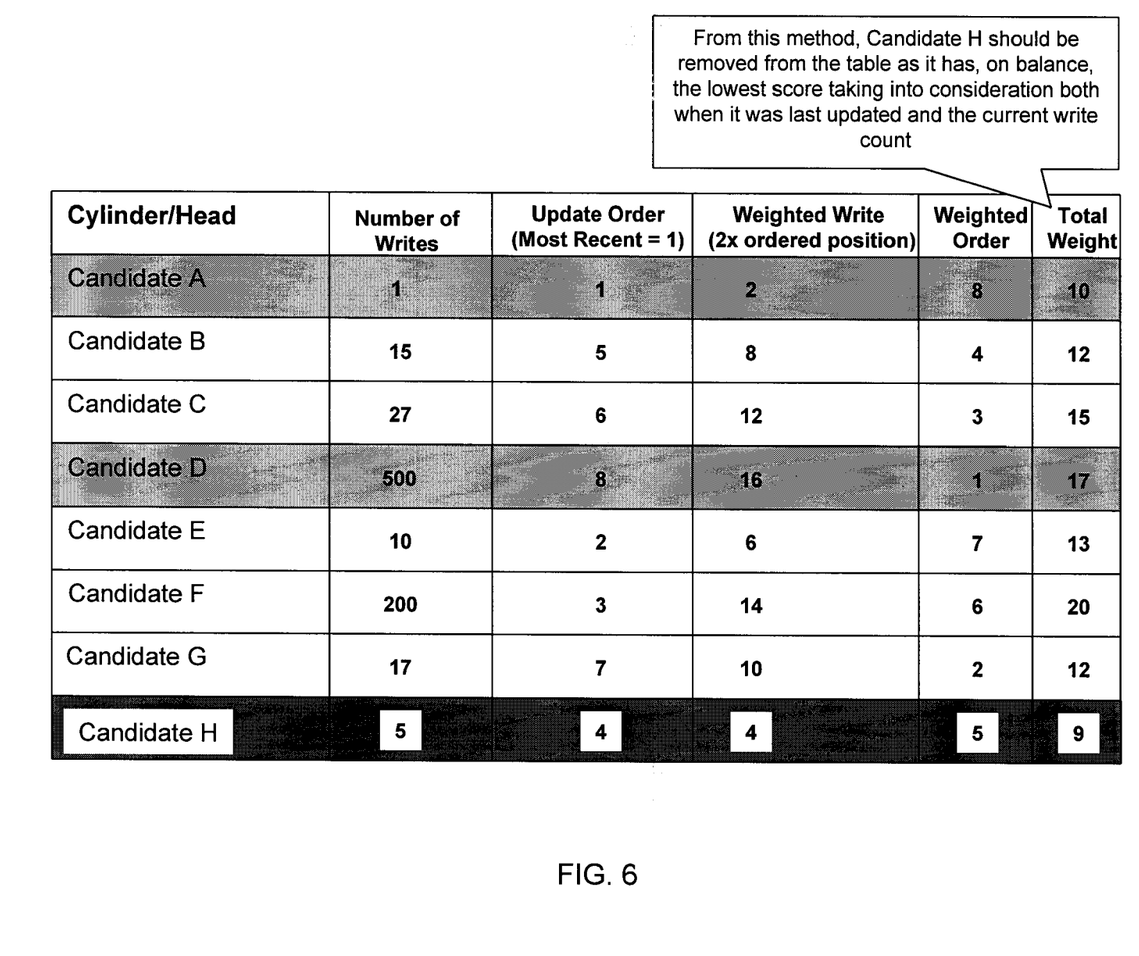
FIG. 6 illustrates an exemplary ATI risk management table according to one embodiment of the invention.

Referring to FIG. 6, the candidates are reordered in the table according to a total weight (track total weight), which is calculated based on the weighted order and the weighted write fields, in this non-limiting example via addition of these two fields. Accordingly, candidate A has a total weight of 2 (weighted write)+8 (weighted order)=10 (total weight). Candidate D has a total weight of 16 (weighted write)+1 (weighted order)=17 (total weight). As illustrated, candidate H (10 (weighted write)+2 (weighted order)=12 (total weight)) is selected as being the track in the table being at low risk for causing ATI in adjacent tracks when compared to the other entries.

Based on the foregoing, candidate H is selected for ejection from the table as being of suitably low risk for causing ATI, making room for an additional track to be logged in the table, for example in response to a subsequent write. Accordingly, logging data for candidates A, B, C, D, E, F and G will be retained in the table. Of the retained tracks, suitable measures (for example, data scrubbing/rewriting the same data to the give location) can periodically be taken, for example when the total weight field exceeds a predetermined threshold value, to ensure that tracks adjacent to these candidates do not suffer from ATI. Once suitable measures have been taken, these candidates can also be removed from the table.

In brief recapitulation, embodiments of the invention provide a table of predetermined size, intelligently edited to maintain the predetermined size while retaining the data relating to the most relevant tracks creating a risk for ATI. Accordingly, embodiments of the invention provide tracking of ATI risk at the track level without burdening systems with an inordinate amount of tracking/logging data.

Although a particularly preferred embodiment of the invention comprises firmware implemented on one or more computer systems, it will be appreciated by one skilled in the art that aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    utilizing one or more processors to execute program instructions configured to:
    add one or more tracks to a track-level Adjacent Track Interference (ATI) log in response to a write action;
    determine an Adjacent Track Interference (ATI) risk for the one or more tracks; and
    maintain the track-level ATI log via ejecting one or more tracks from the track-level ATI log in response to a determination that the one or more tracks has low ATI risk;
    wherein to determine an ATI risk for one or more tracks comprises calculating a track total weight for the one or more tracks, the track total weight being determined by one or more of a weighted write amount associated with the one or more tracks, and a weighted order amount associated with the one or more tracks; and
    wherein:
        the weighted order amount corresponds to a reordering of an update order associated with the one or more tracks; and
        the weighted write amount corresponds to a multiple of an ordered position when the one or more tracks are ordered according to a number of writes associated with the one or more tracks.

2. The method according to claim 1, wherein the track total weight associated with the one or more tracks equals the weighted order amount combined with the weighted write amount.

3. The method according to claim 1, wherein the track total weight associated with the one or more tracks equals the weighted order amount added to the weighted write amount.

4. The method according to claim 1, wherein ejecting one or more tracks from the track-level ATI log in response to a determination that the one or more tracks has low ATI risk further comprises:
    ascertaining X most recently updated tracks; and
    ejecting a track within X having a lowest write count;
    wherein X is a predetermined number of tracks.

5. The method according to claim 1, wherein the program instructions are further configured to:
    based on the track total weight, determine one or more tracks having low risk; and
    eject the one or more tracks having low ATI risk from the track-level ATI log.

6. The method according to claim 1, wherein the program instructions are further configured to:
    based on the track total weight, determine one or more tracks having high ATI risk; and
    retain the one or more tracks having high ATI risk in the track-level ATI log.

7. The method according to claim 6, wherein the program instructions are further configured to:
    scrub data on one or more tracks adjacent to the one or more tracks having high ATI risk; and
    in response to scrubbing data on the one or more tracks adjacent to the one or more tracks having high ATI risk, eject the one or more tracks having high ATI risk from the track-level ATI log.

8. A system comprising:
    one or more system processors;
    a main memory; and
    a hard drive comprising one or more modules comprising one or more processors configured to execute program instructions, the program instructions comprising computer readable program code configured to:
    add one or more tracks to a track-level Adjacent Track Interference (ATI) log in response to a write action;
    determine an Adjacent Track Interference (ATI) risk for the one or more tracks; and
    maintain the track-level ATI log via ejecting one or more tracks from the track-level ATI log in response to a determination that the one or more tracks has low ATI risk;

wherein the one or more system processors direct information stored in the main memory to the hard drive;

wherein to determine an ATI risk for one or more tracks comprises calculating a track total weight for the one or more tracks, the track total weight being determined by one or more of a weighted write amount associated with the one or more tracks, and a weighted order amount associated with the one or more tracks; and wherein:
the weighted order amount corresponds to a reordering of an update order associated with the one or more tracks; and the weighted write amount corresponds to a multiple of an ordered position when the one or more tracks are ordered according to a number of writes associated with the one or more tracks.

9. The system according to claim 8, wherein the track total weight associated with the one or more tracks equals the weighted order amount combined with the weighted write amount.

10. The system according to claim 8, wherein the track total weight associated with the one or more tracks equals the weighted order amount added to the weighted write amount.

11. The system according to claim 8, wherein ejecting one or more tracks from the track-level ATI log in response to a determination that the one or more tracks has low ATI risk further comprises:
ascertaining X most recently updated tracks; and
ejecting a track within X having a lowest write count;
wherein X is a predetermined number of tracks.

12. The system according to claim 8, wherein the program instructions comprising computer readable program code are further configured to:
based on the track total weight, determine one or more tracks having low ATI risk; and
eject the one or more tracks having low ATI risk from the track-level ATI log.

13. The system according to claim 8, wherein the program instructions comprising computer readable program code are further configured to:
based on the track total weight, determine one or more tracks having high ATI risk; and
retain the one or more tracks having high ATI risk in the track-level ATI log.

14. The system according to claim 13, wherein the program instructions comprising computer readable program code are further configured to:
scrub data on one or more tracks adjacent to the one or more tracks having high ATI risk; and
in response to scrubbing data on the one or more tracks adjacent to the one or more tracks having high ATI risk, eject the one or more tracks having high ATI risk from the track-level ATI log.

15. The system according to claim 8, wherein the one or more tracks are one or more tracks on the hard drive.

16. An apparatus comprising:
one or more modules comprising one or more processors configured to execute program instructions, the program instructions comprising computer readable program code configured to:
add one or more tracks to a track-level Adjacent Track Interference (ATI) log in response to a write action;
determine an Adjacent Track Interference (ATI) risk for the one or more tracks; and
maintain the track-level ATI log via ejecting one or more tracks from the track-level ATI log in response to a determination that the one or more tracks has low ATI risk;
wherein to determine an ATI risk for one or more tracks comprises calculating a track total weight for the one or more tracks, the track total weight being determined by one or more of a weighted write amount associated with the one or more tracks, and a weighted order amount associated with the one or more tracks; and
wherein:
the weighted order amount corresponds to a reordering of an update order associated with the one or more tracks; and the weighted write amount corresponds to a multiple of an ordered position when the one or more tracks are ordered according to a number of writes associated with the one or more tracks.

17. The apparatus according to claim 16, wherein the track total weight associated with the one or more tracks equals the weighted order amount combined with the weighted write amount.

18. A computer program product comprising a non-transitory computer readable storage medium having computer readable program code embodied therewith, the computer readable program code being configured to:
add one or more tracks to a track-level Adjacent Track Interference (ATI) log in response to a write action;
determine an Adjacent Track Interference (ATI) risk for the one or more tracks; and
maintain the track-level ATI log via ejecting one or more tracks from the track-level ATI log in response to a determination that the one or more tracks has low ATI risk;
wherein to determine an ATI risk for one or more tracks comprises calculating a track total weight for the one or more tracks, the track total weight being determined by one or more of a weighted write amount associated with the one or more tracks, and a weighted order amount associated with the one or more tracks; and
wherein:
the weighted order amount corresponds to a reordering of an update order associated with the one or more tracks; and the weighted write amount corresponds to a multiple of an ordered position when the one or more tracks are ordered according to a number of writes associated with the one or more tracks.

* * * * *